United States Patent
Fujii et al.

(10) Patent No.: US 9,113,046 B2
(45) Date of Patent: Aug. 18, 2015

(54) TIRE CONTOUR MEASUREMENT DATA CORRECTION METHOD AND TIRE VISUAL INSPECTION DEVICE

(75) Inventors: Tomohiko Fujii, Kodaira (JP); Akinobu Mizutani, Kodaira (JP)

(73) Assignee: BRIDGESTONE CORPORATION, Tokyo (JP)

( * ) Notice: Subject to any disclaimer, the term of this patent is extended or adjusted under 35 U.S.C. 154(b) by 441 days.

(21) Appl. No.: 13/812,082

(22) PCT Filed: Aug. 4, 2011

(86) PCT No.: PCT/JP2011/067855
§ 371 (c)(1),
(2), (4) Date: Jan. 24, 2013

(87) PCT Pub. No.: WO2012/018076
PCT Pub. Date: Feb. 9, 2012

(65) Prior Publication Data
US 2013/0120566 A1    May 16, 2013

(30) Foreign Application Priority Data
Aug. 4, 2010   (JP) ................................. 2010-175152

(51) Int. Cl.
*H04N 7/18*   (2006.01)
*G01B 11/25*   (2006.01)

(52) U.S. Cl.
CPC . *H04N 7/18* (2013.01); *G01B 11/25* (2013.01)

(58) Field of Classification Search
CPC .. G01M 17/013; G01M 17/02; G01M 17/022
USPC ..................... 348/135, 92, 62; 73/146, 146.2; 356/237.1; 702/34, 150
See application file for complete search history.

(56) References Cited

U.S. PATENT DOCUMENTS 6,124,925 A    9/2000  Kaneko et al.
(Continued)

FOREIGN PATENT DOCUMENTS

| JP | A-62-232507 | 10/1987 |
| JP | A-02-042306 | 2/1990 |
| JP | A-05-228634 | 9/1993 |
| JP | A-11-138654 | 5/1999 |

(Continued)

OTHER PUBLICATIONS

Oct. 18, 2011 International Search Report issued in Application No. PCT/JP2011/067855 (with translation).

*Primary Examiner* — Jefferey Harold
*Assistant Examiner* — Jean W Desir
(74) *Attorney, Agent, or Firm* — Oliff PLC

(57) ABSTRACT

In order to conduct a visual inspection correctly for a tire having deflection, contour deformation caused by the deflection of the tire is corrected with respect to tire contour measurement data. A tire contour measurement data correction method includes a step of obtaining a sidewall image in a tire radial direction at each certain rotation angle by a sensor portion while rotating a tire T to be inspected by a tire rotation portion, a step of dividing the sidewall image by a predetermined ratio by an image processing portion and approximating the sidewall image of each divided section by a straight line, a step of calculating an inclination angle in a horizontal direction of the approximate straight line, and a step of rotating the sidewall image of each divided section so that the inclination angle of the approximate straight line agrees with a predetermined angle determined for each divided section.

18 Claims, 5 Drawing Sheets

(56) References Cited

U.S. PATENT DOCUMENTS

| | | | |
|---|---|---|---|
| 7,578,181 B2* | 8/2009 | Mizuno et al. | 73/146 |
| 8,305,436 B2* | 11/2012 | Fujisawa et al. | 348/92 |
| 2009/0049902 A1 | 2/2009 | Mizuno et al. | |

FOREIGN PATENT DOCUMENTS

| | | |
|---|---|---|
| JP | A-2006-300619 | 11/2006 |
| JP | A-2010-014698 | 1/2010 |
| WO | WO 2011/070750 A1 | 6/2011 |

* cited by examiner

TIRE CONTOUR MEASUREMENT DATA CORRECTION METHOD AND TIRE VISUAL INSPECTION DEVICE

TECHNICAL FIELD

The present invention relates to a tire contour measurement data correction method for determining acceptability of tire appearance and a tire visual inspection device.

BACKGROUND ART

When acceptability of a tire shape is to be determined, a rubber material portion which is a tire main body portion constituting an outer peripheral portion is attached to a ring-shaped metal component (rim) constituting an inner peripheral portion of a tire, and after the inside is filled with air, an appearance shape of a tire side portion (sidewall), for example, is grasped and acceptability is determined.

As such methods for grasping tire appearance shapes, a method using a three-dimensional shape measuring method called a light section method (See Patent Literature 1) and a method using an optical displacement sensor (See Patent Literature 2) are known.

Here, the light section method is a method of irradiating a tire surface (sidewall, for example) along a radial direction of a tire with light (line light) linearly focused by a cylindrical lens or the like, photographing the shape of the line light on the tire surface by a camera or the like, and measuring a surface shape of the tire at a light irradiated portion (linear portion) according to the principle of triangulation from the obtained photographed image. By using this method, for example, performing the measurement at certain rotation angle intervals while rotating the tire makes it possible to grasp the sidewall shape of the entire periphery of the tire.

On the other hand, the optical displacement sensor focuses emitted light from a laser or the like into a spot shape (point shape) to irradiate the tire surface therewith, receives its reflected light by a linear image sensor such as CCD, and measures a height of the tire surface at a light irradiated portion (point-shaped portion) from a change in the position of the reflected light. Since the optical displacement sensor measures only the height of the point-shaped portion irradiated with light, as described above, when the surface shape of the sidewall is to be measured, for example, a plurality of the optical displacement sensors is juxtaposed for use in the radial direction of the tire to perform measurement at certain rotation angle intervals while rotating the tire similarly to the light section method so that the sidewall shape of the entire periphery of the tire is grasped.

However, with the above-described prior-art methods, after the measurement data of the tire appearance shape (hereinafter referred to as "tire contour measurement data") is obtained, since contour deformation caused by deflection is not corrected, the contour of a deflected tire cannot be inspected correctly.

Hence, if the tire appearance shape is measured by the above-described prior-art methods, the tire main body should be incorporated in the rim and air should be filled, and an internal pressure should be raised to a state where there is no deflection caused in the tire, and thus, there is a problem that preparation time for the measurement becomes long and productivity lowers.

CITATION LIST

Patent Literature

Patent Literature 1: Japanese Unexamined Patent Application Publication No. 2010-14698

Patent Literature 2: Japanese Unexamined Patent Application Publication No. 2-42306

SUMMARY OF THE INVENTION

Problems to be Solved by the Invention

The present invention is made in view of the above-described prior-art problems and has an object to enable visual inspection even for a tire with deflection correctly without requiring a preparation work or lowering productivity by correcting contour deformation caused by deflection with respect to tire contour measurement data.

Means for Solving the Problems (1) The present invention is a tire contour measurement data correction method in a tire visual inspection device, and is characterized in that the method includes the steps of: measuring surface shapes of a sidewall along a radial direction of a tire at every predetermined rotation angle around a rotation center of the tire; approximating each of the surface shapes measured in the measuring step by a straight line for each section obtained by dividing a distance between an end portion on the shoulder side and an end portion on the rim side of each of the surface shapes by a predetermined ratio and calculating an approximate straight line; and rotating data of the surface shape of the each section measured in the measuring step so that an inclination angle in the horizontal direction of the approximate straight line calculated in the step of calculating the approximate straight line agrees with a predetermined angle determined for the each section.

(2) The present invention is characterized in that, in the tire contour measurement data correction method described in (1), the predetermined angle determined for the each section is an average value of the each section of the inclination angle of the approximate straight line calculated in the calculating step.

(3) The present invention is characterized in that, in the tire contour measurement data correction method described in (1) or (2), the approximate straight line calculated in the step of calculating the approximate straight line is calculated by the least square method on the basis of data of the surface shape measured in the measuring step.

(4) The present invention is characterized in that, in the tire contour measurement data correction method described in any one of (1) to (3), in the measuring step, the surface shape is measured by a light section method.

(5) The present invention is characterized in that, in the tire contour measurement data correction method described in any one of (1) to (4), in the measuring step, the surface shape is measured over the entire periphery of the tire.

(6) The present invention is a tire visual inspection device characterized by including shape measuring means for measuring surface shapes of a sidewall along a radial direction of a tire at every predetermined rotation angle around a center of the tire; straight line approximating means for approximating each of the surface shapes measured by the shape measuring means by a straight line for each section obtained by dividing a distance between an end portion on the shoulder side and an end portion on the rim side of each of the surface shapes by a predetermined ratio and for calculating an approximate straight line; and rotation processing means for rotating and processing data of the surface shape for the each section measured by the shape measuring means so that an inclination angle in the horizontal direction of the approximate straight line calculated by the straight line approximating means agrees with a predetermined angle determined for the each section.

(7) The present invention is characterized by including, in the tire visual inspection device described in (6), a placement base for laterally placing the tire and a tire rotation portion including rotation driving means of the placement base.

Advantageous Effect of the Invention

According to the present invention, by correcting contour deformation caused by deflection with respect to tire contour measurement data, it is possible to correctly perform visual inspection of a tire with deflection without requiring a preparation work or lowering productivity.

DESCRIPTION OF EMBODIMENTS

An embodiment of the present invention will be described below by referring to the attached drawings.

Figure 1:
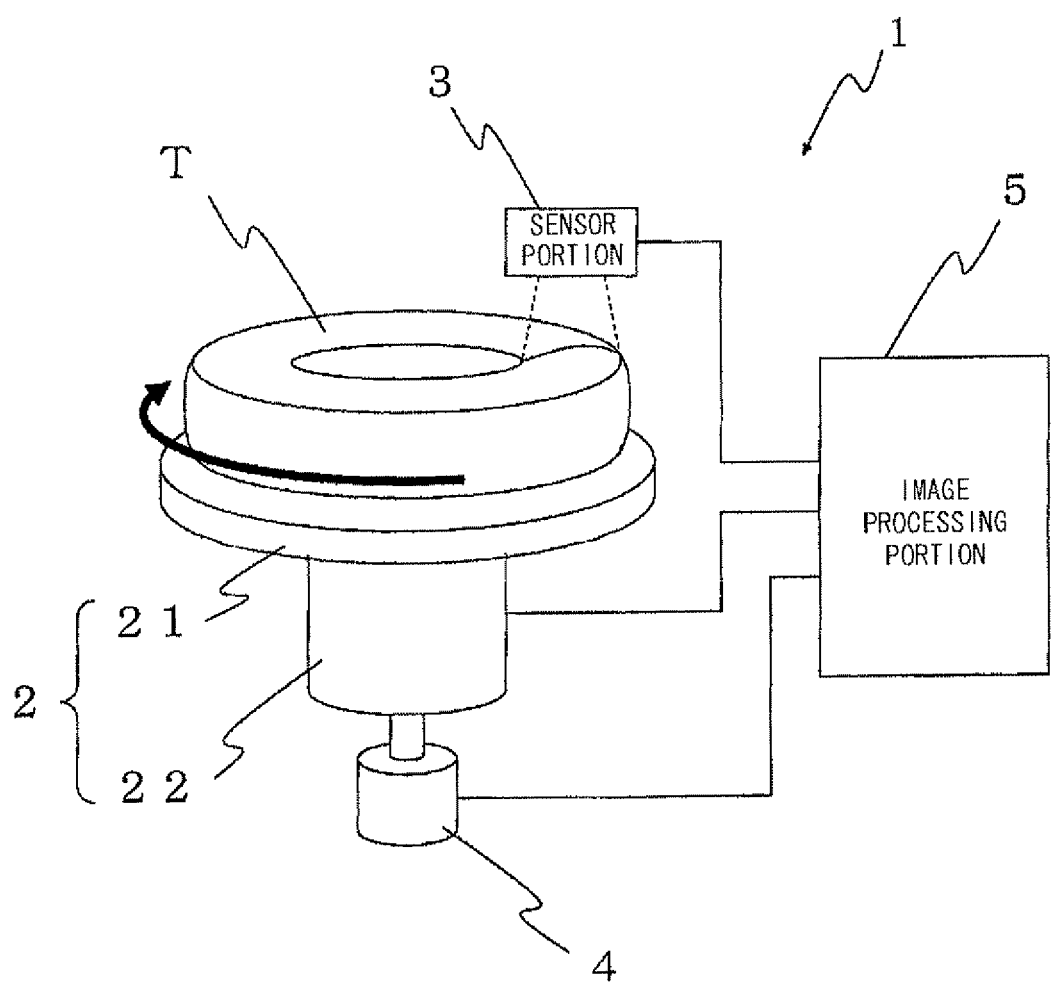
FIG. 1 is a block diagram illustrating a configuration of a tire visual inspection device according to an embodiment of the present invention.

FIG. 1 is a block diagram illustrating a configuration of a tire visual inspection device according to one embodiment of the present invention.

A tire visual inspection device 1 has a tire rotation portion 2 for rotating a tire T which is an inspection target by a stepping motor, for example, a sensor portion 3 for irradiating the tire T with line light and photographing an image of the line light, a rotation angle detection portion 4 for detecting a rotation angle of the tire rotation portion 2, and an image processing portion 5 for performing processing of the line light image photographed by the sensor portion 3 and the like.

The tire rotation portion 2 includes a disk-shaped tire placement base 21 for placing the tire T laterally, and a rotation driving portion 22 integrally attached to the lower end of the tire placement base 21 for rotating and driving the tire placement base 21 by a built-in stepping motor, not shown.

Figure 2:
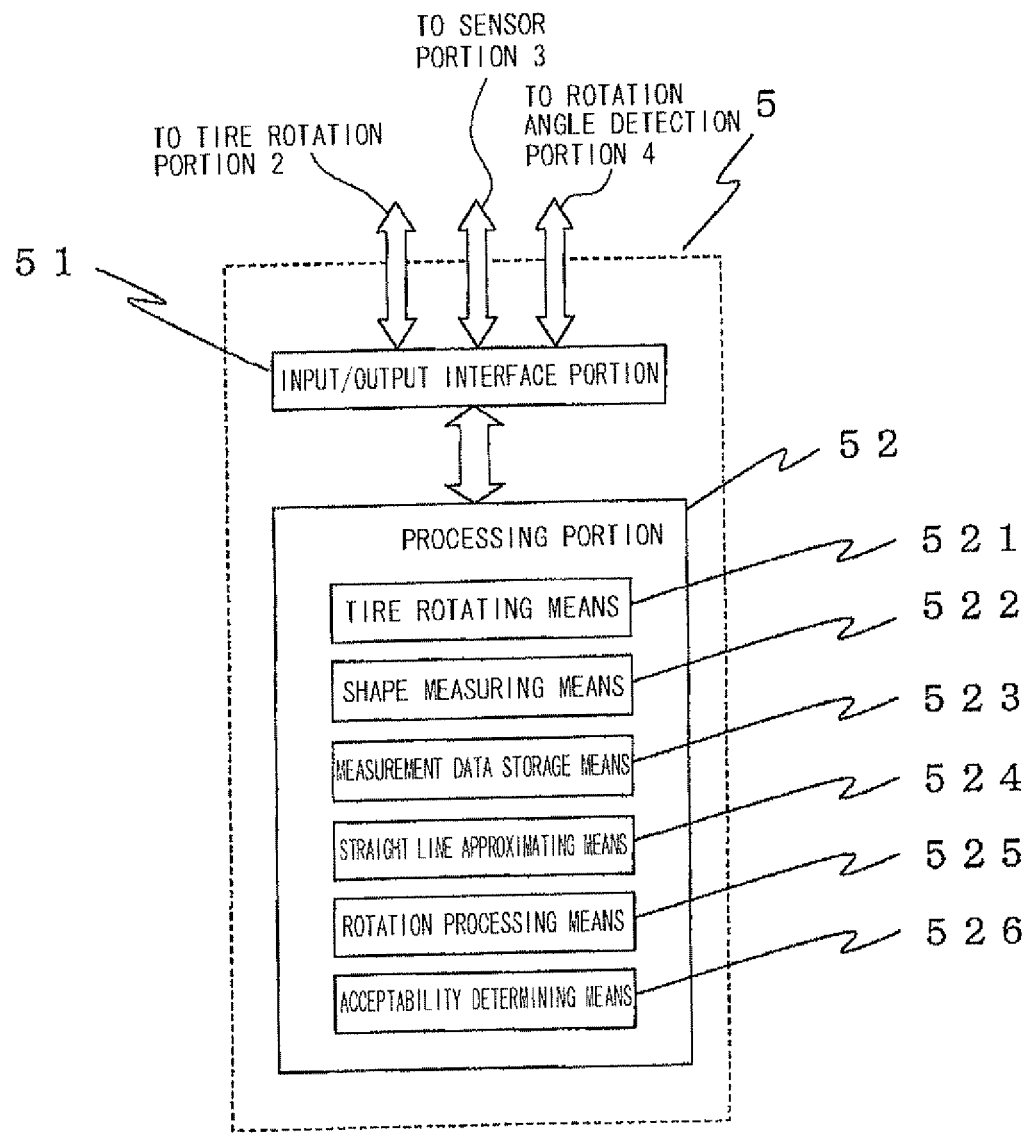
FIG. 2 is a block diagram illustrating a configuration of an image processing portion of the tire visual inspection device.

FIG. 2 is a block diagram illustrating a configuration of the image processing portion 5 of this tire visual inspection device 1. The image processing portion 5 has an input/output interface portion 51 which is a communication portion for conducting data communication with the sensor portion 3 and the like and a processing portion 52 for processing image data, and the processing portion 52 has tire rotating means 521 for rotating the tire T by giving an operation signal to the tire rotation portion 2 while detecting a rotation angle by the rotation angle detection portion 4, shape measuring means 522 for measuring a shape of a sidewall by obtaining the image data of line light by the sensor portion 3 at each predetermined rotation angle, measurement data storage means 523 for storing data (sidewall measurement data) representing the shape of the sidewall measured by the shape measuring means 522, straight line approximating means 524 for dividing the respective pieces of sidewall measurement data into a plurality of sections by a predetermined ratio and for calculating an approximate straight line of the sidewall measurement data for each section, rotation processing means for performing rotation processing which will be described later on the sidewall measurement data for each section, and acceptability determining means 526 for determining acceptability of the appearance shape of the tire T on the basis of the sidewall measurement data.

Here, the processing portion 52 is a computer having a CPU (Central Processing Unit), a ROM (Read Only Memory) in which a program is written, a RAM (Random Access Memory) for temporarily storing data and the like, for example, the above-described measurement data storage means 523 is the above-described RAM, and each of the above-described means other than the above-described measurement data storage means 523 of the processing portion 52 is function realizing means realized by the computer including the CPU by the program. The computer program can be stored in an arbitrary storage medium.

Figure 3:
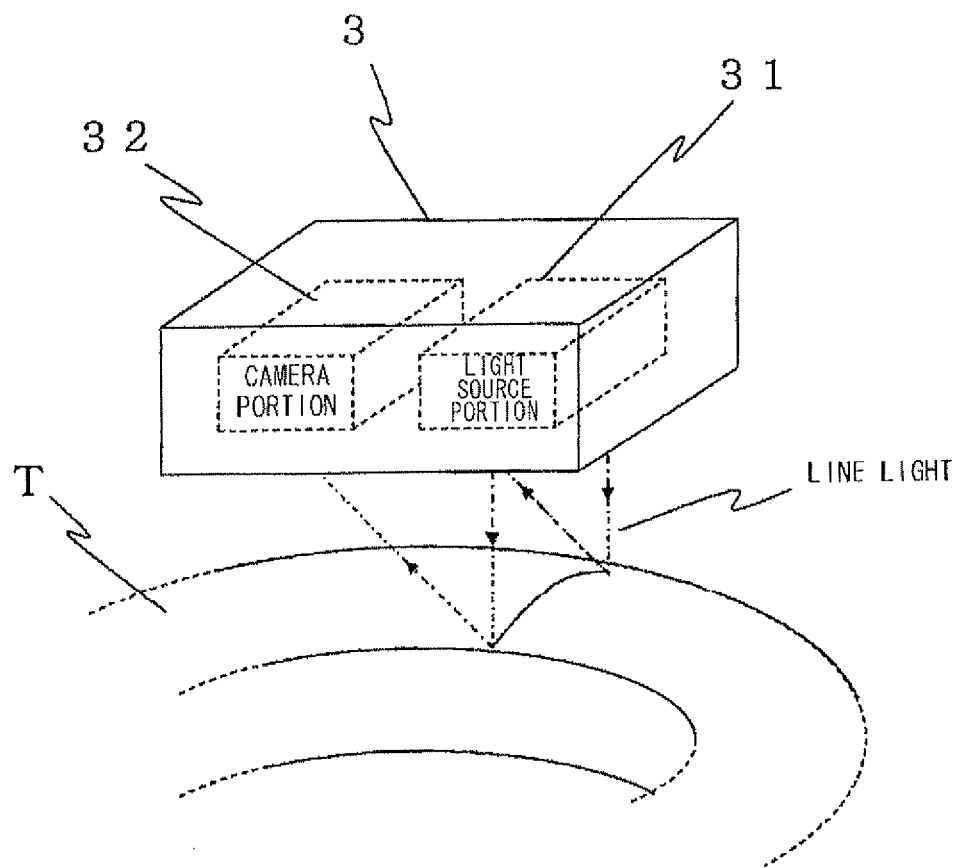
FIG. 3 is a diagram illustrating a configuration of a sensor portion of the tire visual inspection device.

FIG. 3 is a diagram illustrating a configuration of the sensor portion 3 of this tire visual inspection device 1. The sensor portion 3 has a light source portion 31 for focusing emitted light from a semiconductor laser by a cylindrical lens or the like, for example, to output line light and a camera portion 32 for photographing the line light outputted from the light source portion 31 and reflected by the tire T surface. The camera portion 32 may be composed of an image pickup element such as a CCD and a spherical lens for forming an image of the line light reflected by the tire T surface on the image pickup element, for example. As described above, since the light source portion 31 outputs line light, the shape measuring means 522 can measure the shape of a sidewall by the light section method on the basis of image data from the sensor portion 3.

The image of the sidewall (sidewall image) photographed by the sensor portion 3 is sent to the shape measuring means 522, and the shape measuring means 522 outputs curve data (a series of two-dimensional coordinates) representing the shape of the sidewall surface at the photographed position on the basis of the sidewall image as sidewall measurement data.

Figure 4:
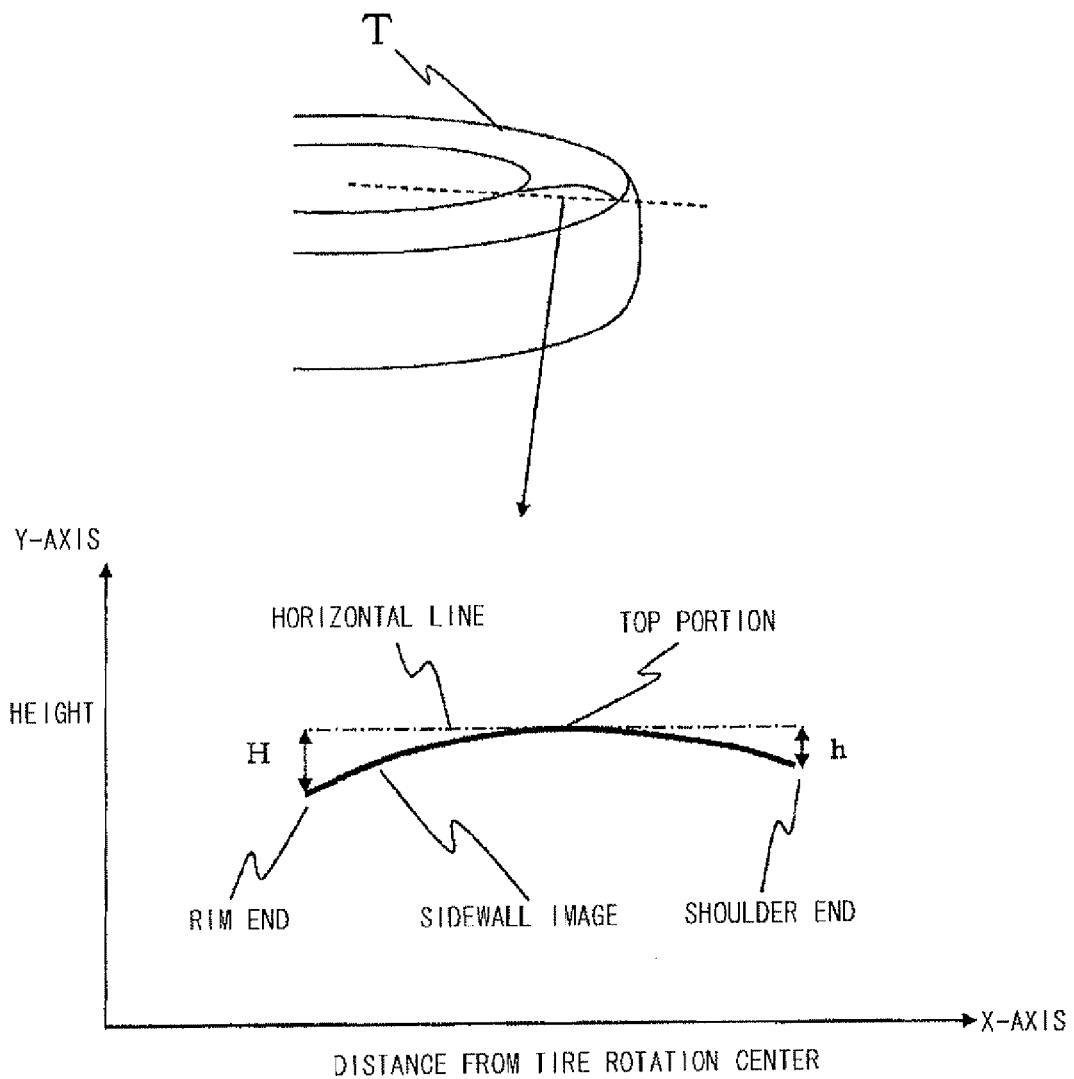
FIG. 4 is an example of a sidewall image photographed by the sensor portion of the tire visual inspection device.

FIG. 4 is an example of the sidewall image photographed by the sensor portion 3. The right end is an end of a sidewall on the shoulder side (shoulder end), and the left end is an end of the sidewall on the rim side (rim end). Normally, there is a portion raised the most substantially at the center thereof (hereinafter referred to as a "top portion"), and the height gradually lowers toward the rim end or the shoulder end. Here, assuming that a height difference between the rim end and the top portion is H and a height difference between the shoulder end and the top portion is h, when the tire T is not incorporated in the rim and is deflected, H and h change for each sidewall measurement data in a tire T rotation direction. A change amount of H (referred to as ΔH) corresponds to a width of deflection on the rim end and a change amount of h (referred to as Δh) corresponds to a width of deflection on the shoulder end, respectively.

The tire visual inspection device 1 described above operates substantially as follows.

First, when a user turns on power of the tire visual inspection device 1, the image processing portion 5 obtains the sidewall image for every certain rotation angle while rotating the tire T by the tire rotating means 521 and the shape measuring means 522 and generates the sidewall measurement data on the basis of the sidewall image. Subsequently, the image processing portion 5 divides a distance between the rim end and the shoulder end by the straight line approximating means 524 by a predetermined ratio for each piece of the sidewall measurement data and approximates the sidewall measurement data after the division by a straight line for each section.

Moreover, the image processing portion 5 performs rotation processing on the sidewall measurement data of each section by the rotation processing means 525 so that an inclination angle in the horizontal direction of the approximate straight line becomes a predetermined angle at each section. Here, the rotation processing specifically uses a rotation matrix formula used in linear algebra and the like, for example, which is known, and a fulcrum (rotation center) is determined and the data is rotated around the fulcrum. Here, the fulcrum may be determined anywhere on a tire periphery as long as deflection does not occur even if an internal pressure is not filled and may be a rim line, for example, or the like. There is a merit that a spot which looks relatively dark due to deflection appears bright by this rotation processing.

By means of this rotation processing, the height difference H between the rim end and the top portion and the height difference h between the shoulder end and the top portion become substantially constant values throughout all the sidewall images, and $\Delta H$ and $\Delta h$ corresponding to the widths of deflection on the rim end and the shoulder end become approximately zero, and the deflection on the rim end and the shoulder end in the sidewall measurement data is corrected.

Figure 5:
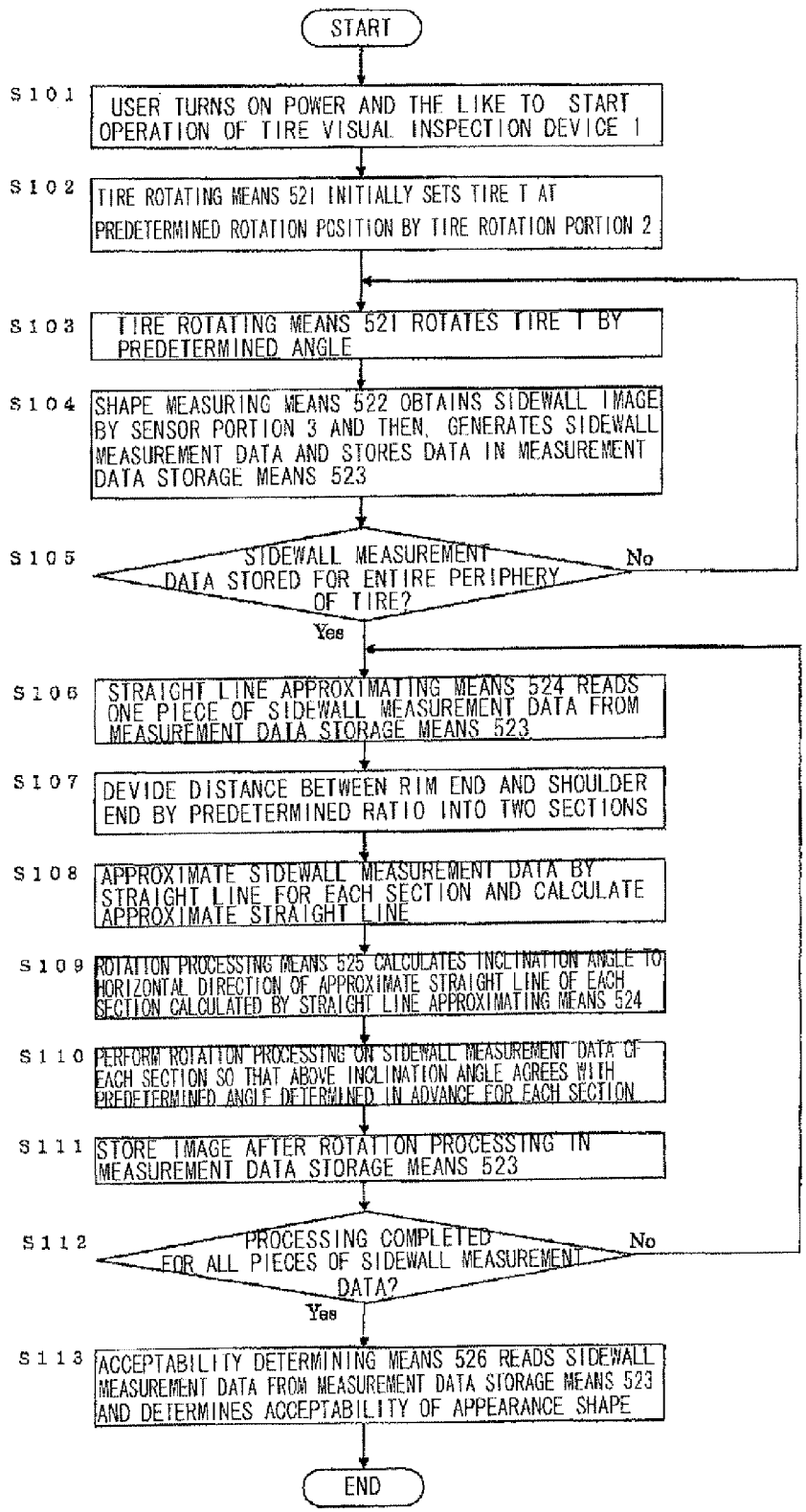
FIG. 5 is a flowchart illustrating an operation procedure of the tire visual inspection device.

Subsequently, an operation procedure of this embodiment will be described in accordance with a flowchart in FIG. 5.

(1) When a user turns on power or the like and starts an operation of the tire visual inspection device 1 (S101), first, the tire rotating means 521 of the image processing portion 5 initially sets the tire T at a predetermined rotation position by the tire rotation portion 2 (S102).

(2) The tire rotating means 521 rotates the tire T by a predetermined angle by the tire rotation portion 2 while measuring a rotation angle of the tire T by the rotation angle detection portion 4 (S103). Subsequently, the shape measuring means 522 obtains a sidewall image from the sensor portion 3 and then, generates measurement data representing the shape of the sidewall (sidewall measurement data) on the basis of the sidewall image and stores the measurement data in the measurement data storage means 523 which is a RAM, for example (S104).

(3) It is determined whether or not the sidewall measurement data has been stored for the entire periphery of the tire T (S105), and if the data has been stored for the entire periphery of the tire (S105, Yes), the routine proceeds to Step S106, while if the data has not been stored for the entire periphery of the tire (S105, No), the routine returns to Step S103, and the above operation is repeated. As a result, the sidewall measurement data can be generated and stored at certain angle intervals over the entire periphery of the tire. The whole sidewall measurement data generated for the entire periphery of the tire is tire contour measurement data representing the appearance shape of the entire tire T.

(4) The straight line approximating means 524 reads one piece of the sidewall measurement data stored in the measurement data storage means 523 (S106). Subsequently, the distance between the rim end and the shoulder end is divided by a predetermined ratio (1:1, for example) into two sections (S107), the sidewall measurement data is approximated by a straight line for each section, and the approximate straight line is calculated (S108). Here, the number of divided sections does not necessarily have to be two but may be the number larger than that. Moreover, as a calculating method of an approximate straight line, the least square method, for example, can be used.

(5) The rotation processing means 525 calculates an inclination angle with respect to the horizontal direction for the approximate straight line of each section calculated at Step S108 (S109) and performs rotation processing on the sidewall measurement data for each section so that this inclination angle agrees with a predetermined angle determined in advance for each section (S110), and stores the sidewall measurement data after the rotation processing in the measurement data storage means 523 (S111). Here, the predetermined angle determined in advance for each section may be an average value of the inclination angle of the approximate straight line of each section, for example, or may be an arbitrary predetermined value in a tire when air is filled. Moreover, the rotation center in the rotation processing performed at Step S110 can be selected arbitrarily, and if a boundary point of the sections on the sidewall measurement data is assumed to be the rotation center, for example, the sidewall measurement data after the rotation processing continues at the boundary point between the sections, and acceptability determination of the appearance shape at Step S113 performed later is simplified.

(6) It is determined whether or not processing has been completed for all pieces of the sidewall measurement data stored in the measurement data storage means 523 (S112), and if processing has been completed (S112, Yes), the acceptability determining means 526 reads a series of sidewall measurement data from the measurement data storage means 523 and determines acceptability of the appearance shape. (S113).

(7) On the other hand, if the processing has not been completed for all pieces of the sidewall measurement data (S112, No), the routine returns to Step S106, and the similar processing is repeated for the subsequent sidewall measurement data.

Here, acceptability determination of the appearance shape at the above-described Step S113 can be made for each of the above-described sections and if the sidewall measurement data of each section is not continuous, by translating the sidewall measurement data of each section and connecting them at a division point, the acceptability determination can be made for the entire sidewall. Moreover, the acceptability determination result can be notified to a user by providing a display device and the like, for example. The acceptability determination of the appearance shape can be made on the basis of whether or not a difference between the sidewall measurement data and a reference shape data determined in advance is within a predetermined value.

As described above, in this embodiment, a distance between the rim end and the shoulder end is divided by a predetermined ratio for each piece of the sidewall measurement data photographed at certain angle intervals, the sidewall measurement data of each section after the division is approximated by a straight line and also, rotation processing is performed on the sidewall measurement data for each section so that the inclination angle in the horizontal direction of the approximate straight line becomes a predetermined angle.

As a result, the height difference H between the rim end and the top portion and the height difference h between the shoulder end and the top portion become a substantially constant value throughout all pieces of the sidewall measurement data, $\Delta H$ and $\Delta h$ corresponding to the widths of the deflection on the rim end and the shoulder end become approximately zero, and the deflection on the rim end and the shoulder end can be corrected from the series of the sidewall measurement data (that is, the tire contour measurement data).

In the above-described embodiment, explanation was made for the case in which the tire T is rotated and the tire appearance is inspected by the sensor portion 3, but the present invention is not necessarily limited to the above-described configuration and it may be so configured that the tire is placed on the placement base in a laterally placed state, and the sensor portions 3 is rotated around the center of the tire by using an arbitrary rotation driving mechanism.

Other configurations and processes in this case are not different from the above-described embodiment, and the same working effects as those in the above-described embodiment can be obtained.

REFERENCE SIGNS LIST 1 tire visual inspection device
2 tire rotation portion
3 sensor portion
4 rotation angle detection portion
5 image processing portion
21 tire placement base
22 rotation driving portion
31 light source portion
32 camera portion
51 input/output interface portion
52 processing portion
521 tire rotating means
522 shape measuring means
523 measurement data storage means
524 straight line approximating means
525 rotation processing means
526 acceptability determining means.

The invention claimed is:

1. A tire contour measurement data correction method in a tire visual inspection device, the method comprising the steps of:
   measuring surface shapes of a sidewall along a radial direction of a tire at every predetermined rotation angle around a rotation center of the tire;
   approximating each of the surface shapes measured in the measuring step by a straight line for each section obtained by dividing a distance between an end portion on the shoulder side and an end portion on the rim side of each of the surface shapes by a predetermined ratio and calculating an approximate straight line; and
   rotating data of the surface shape of the each section measured in the measuring step so that an inclination angle in the horizontal direction of the approximate straight line calculated in the step of calculating the approximate straight line agrees with a predetermined angle determined for the each section.

2. The tire contour measurement data correction method according to claim 1, wherein
   the predetermined angle determined for the each section is an average value of the each section of the inclination angle of the approximate straight line calculated in the calculating step.

3. The tire contour measurement data correction method according to claim 1, wherein
   the approximate straight line calculated in the step of calculating the approximate straight line is calculated by the least square method on the basis of data of the surface shape measured in the measuring step.

4. The tire contour measurement data correction method according to claim 1, wherein
   in the measuring step, the surface shape is measured by a light section method.

5. The tire contour measurement data correction method according to claim 1, wherein
   in the measuring step, the surface shape is measured over the entire periphery of the tire.

6. The tire contour measurement data correction method according to claim 2, wherein
   the approximate straight line calculated in the step of calculating the approximate straight line is calculated by the least square method on the basis of data of the surface shape measured in the measuring step.

7. The tire contour measurement data correction method according to claim 2, wherein
   in the measuring step, the surface shape is measured by a light section method.

8. The tire contour measurement data correction method according to claim 3, wherein
   in the measuring step, the surface shape is measured by a light section method.

9. The tire contour measurement data correction method according to claim 6, wherein
   in the measuring step, the surface shape is measured by a light section method.

10. The tire contour measurement data correction method according to claim 2, wherein
    in the measuring step, the surface shape is measured over the entire periphery of the tire.

11. The tire contour measurement data correction method according to claim 3, wherein
    in the measuring step, the surface shape is measured over the entire periphery of the tire.

12. The tire contour measurement data correction method according to claim 4, wherein
    in the measuring step, the surface shape is measured over the entire periphery of the tire.

13. The tire contour measurement data correction method according to claim 6, wherein
    in the measuring step, the surface shape is measured over the entire periphery of the tire.

14. The tire contour measurement data correction method according to claim 7, wherein
    in the measuring step, the surface shape is measured over the entire periphery of the tire.

15. The tire contour measurement data correction method according to claim 8, wherein
    in the measuring step, the surface shape is measured over the entire periphery of the tire.

16. The tire contour measurement data correction method according to claim 9, wherein
    in the measuring step, the surface shape is measured over the entire periphery of the tire.

17. A tire visual inspection device comprising:
    shape measuring means for measuring surface shapes of a sidewall along a radial direction of a tire at every predetermined rotation angle around a center of the tire;
    straight line approximating means for approximating each of the surface shapes measured by the shape measuring means by a straight line for each section obtained by dividing a distance between an end portion on the shoulder side and an end portion on the rim side of each of the surface shapes by a predetermined ratio and for calculating an approximate straight line; and
    rotation processing means for rotating and processing data of the surface shape for the each section measured by the shape measuring means so that an inclination angle in the horizontal direction of the approximate straight line calculated by the straight line approximating means agrees with a predetermined angle determined for the each section.

18. The tire visual inspection device according to claim 17, further comprising:

a placement base for laterally placing the tire and a tire rotation portion including rotation driving means of the placement base.

\* \* \* \* \*